US012259076B2

(12) United States Patent
Kitagawa et al.

(10) Patent No.: US 12,259,076 B2
(45) Date of Patent: Mar. 25, 2025

(54) ELECTROFUSION JOINT

(71) Applicant: SEKISUI CHEMICAL CO., LTD., Osaka (JP)

(72) Inventors: Ayaka Kitagawa, Kyoto (JP); Hiroaki Kondou, Kyoto (JP); Kouzou Makino, Kyoto (JP)

(73) Assignee: SEKISUI CHEMICAL CO., LTD., Osaka (JP)

(*) Notice: Subject to any disclaimer, the term of this patent is extended or adjusted under 35 U.S.C. 154(b) by 140 days.

(21) Appl. No.: 17/764,722

(22) PCT Filed: Sep. 28, 2020

(86) PCT No.: PCT/JP2020/036567
§ 371 (c)(1),
(2) Date: Mar. 29, 2022

(87) PCT Pub. No.: WO2021/065776
PCT Pub. Date: Apr. 8, 2021

(65) Prior Publication Data

US 2022/0341528 A1 Oct. 27, 2022

(30) Foreign Application Priority Data

Sep. 30, 2019 (JP) ................................ 2019-179793

(51) Int. Cl.
*F16L 47/03* (2006.01)
*B29C 65/34* (2006.01)
(Continued)

(52) U.S. Cl.
CPC .......... *F16L 47/03* (2013.01); *B29C 65/3432* (2013.01); *B29K 2101/12* (2013.01); *B29L 2031/24* (2013.01)

(58) Field of Classification Search
CPC ........ F16L 47/03; F16L 53/38; F16L 13/0227
See application file for complete search history.

(56) References Cited

U.S. PATENT DOCUMENTS 4,618,168 A * 10/1986 Thalmann .............. F16L 47/03 219/535
4,788,086 A * 11/1988 Matsuda ................ F16L 53/38 428/389

(Continued)

FOREIGN PATENT DOCUMENTS

CH 683026 A5 * 12/1993 ............. F16L 47/03
CN 113738985 A * 12/2021 ............. F16L 47/03

(Continued)

OTHER PUBLICATIONS

English translation of previously cited German Patent No. DE 102010029715A1.*

(Continued)

*Primary Examiner* — Matthew Troutman
*Assistant Examiner* — Fannie Kee
(74) *Attorney, Agent, or Firm* — Wenderoth, Lind & Ponack, L.L.P.

(57) ABSTRACT

An electrofusion joint includes a main body and a heating wire. The main body is configured to be connected to a resin pipe containing a thermoplastic resin. The heating wire is in the main body. The heating wire includes a conducting wire and an insulating cover film that is around the conducting wire. The insulating cover film has a melting point of at least 230 degrees.

6 Claims, 10 Drawing Sheets

100 1 61 6 12 24 12a 25 22 11a 23 21 61 11 22b S 22a A2 A1 51 51 12f 1f 11f

(51) Int. Cl.

| | |
|---|---|
| *B29K 101/12* | (2006.01) |
| *B29L 31/24* | (2006.01) |

(56) References Cited

U.S. PATENT DOCUMENTS

| | | | | | |
|---|---|---|---|---|---|
| 4,842,305 | A * | 6/1989 | Kistenich | F16L 47/03 | 285/21.2 |
| 4,852,914 | A * | 8/1989 | Lyall | F16L 47/03 | 285/21 |
| 4,929,817 | A | 5/1990 | Mito et al. | | |
| 5,320,697 | A * | 6/1994 | Hegler | F16L 47/03 | 285/21.2 |
| 5,336,851 | A * | 8/1994 | Sawada | F16L 53/38 | 174/110 A |
| 2009/0097910 | A1 * | 4/2009 | Cloos | F16L 47/03 | 403/270 |
| 2010/0025991 | A1 * | 2/2010 | Kim | F16L 47/03 | 285/370 |
| 2015/0027581 | A1 * | 1/2015 | Bouey | F16L 47/03 | 285/21.2 |
| 2015/0210823 | A1 * | 7/2015 | Uliel | F16L 47/03 | 285/21.2 |
| 2016/0118159 | A1 * | 4/2016 | Mayama | F16L 53/38 | 174/110 SR |

FOREIGN PATENT DOCUMENTS

| | | | | |
|---|---|---|---|---|
| DE | 102007042806 | A1 * | 3/2009 | F16L 47/03 |
| DE | 102010029715 | A1 * | 12/2011 | F16L 47/03 |
| EP | 3953634 | B1 * | 11/2023 | F16L 53/38 |
| GB | 2318543 | A * | 4/1998 | F16L 47/03 |
| GB | 2319576 | A * | 5/1998 | F16L 47/03 |
| GB | 2425337 | A * | 10/2006 | F16L 47/03 |
| JP | 1-74119 | | 5/1989 | |
| JP | 4-8994 | | 1/1992 | |
| JP | 5-71591 | | 9/1993 | |
| JP | 9-144977 | | 6/1997 | |
| JP | 9-287688 | | 11/1997 | |
| JP | 10-220676 | | 8/1998 | |
| JP | 10281383 | | 10/1998 | |
| JP | 11-51279 | | 2/1999 | |
| JP | 2016-194340 | | 11/2016 | |
| JP | 2020091004 | A * | 6/2020 | F16L 47/03 |
| KR | 100900216 | B1 * | 6/2009 | F16L 47/03 |
| KR | 20110096758 | A * | 8/2011 | F16L 47/03 |
| KR | 20170103360 | A * | 9/2017 | F16L 47/03 |
| KR | 10-2018-0027943 | | 3/2018 | |
| KR | 20180027943 | A * | 3/2018 | F16L 47/03 |
| WO | 97/13996 | | 4/1997 | |
| WO | WO-9713996 | A1 * | 4/1997 | F16L 47/03 |
| WO | WO-9749540 | A1 * | 12/1997 | F16L 47/03 |
| WO | WO-2009007511 | A1 * | 1/2009 | F16L 47/03 |
| WO | 2009/033603 | | 3/2009 | |

OTHER PUBLICATIONS

International Search Report issued Nov. 2, 2020 in International (PCT) Application No. PCT/JP2020/036567.

Written Opinion of the International Searching Authority issued Nov. 2, 2020 in International (PCT) Application No. PCT/JP2020/036567.

International Preliminary Report on Patentability (Chapter I) for the corresponding PCT Application No. PCT/JP2020/036567 issued on Apr. 5, 2022, with the English-language translation.

* cited by examiner

ELECTROFUSION JOINT

TECHNICAL FIELD

The present invention relates to an electrofusion joint.

DESCRIPTION OF THE RELATED ART

Electrofusion joints are often used when connecting resin pipes or pipes in which a resin is used, such as a metal-reinforced composite pipe having a resin layer and a metal reinforcing layer (see, for example, JP-A 2016-194340).

For example, the electrofusion joint shown in JP-A 2016-194340 has a joint body that is made of a thermoplastic resin and in both ends of which are formed insertion openings into which the pipes to be connected are inserted, and a heating wire that is embedded on the inner peripheral surface side of the joint body. Also, a stopper that protrudes inward so as to restrict the position of the pipe body is provided on the inner peripheral surface of the joint body. A heating element is made to generate heat in a state in which the pipes to be connected have been inserted into the insertion openings of the electrofusion joint, the result being that the resin on the inner peripheral part of the insertion openings and the resin on the outer peripheral part of the pipe are fused around the heating element, and the pipes are connected to each other via this electrofusion joint.

SUMMARY OF THE INVENTION

However, when there is a gap between the pipes and the electrofusion joint, cleaning chemicals for the pipe or foreign matter from during installation may settle in the gap in a transport line for high-purity liquids such as ultrapure water, and the foreign matter may be mixed into the high-purity liquid over an extended period of time.

One way to deal with this is to turn on the power to the heating element while pressing the pipe against the electrofusion joint so as to eliminate any gap, but this runs the risk that adjacent heating wires may come into contact with each other and cause a short circuit. Once a short circuit occurs, the temperature will not rise any further, and the fusion will not be strong enough.

It is an object of the present invention to provide an electrofusion joint with which a short circuit is less likely to occur, and good fusion strength can be ensured.

Means for Solving Problem

In order to achieve the stated object, the electrofusion joint according to a first aspect comprises a main body and a heating wire. The main body is configured to be connected to a resin pipe containing a thermoplastic resin. The heating wire is disposed in the main body. The heating wire has a conducting wire and an insulating cover film provided around the conducting wire. The insulating cover film has a melting point of at least 230 degrees.

Thus providing an insulating cover film having a melting point of at least 230 degrees around the conducting wire prevents the insulating cover film from melting even at the temperature at which fusion is performed with the heat generated by the heating wire, and this prevents contact between the conducting wires of the heating wire. Therefore, the temperature can be raised high enough to ensure good fusion strength.

The electrofusion joint according to a second aspect is the electrofusion joint according to the first aspect, wherein the heating wire further has an outer layer portion that is provided around the insulating cover film. The outer layer portion is formed from a polyolefin resin.

This increases the strength of the heating wire and prevents the conducting wire from being exposed at the temperature at which the fusion takes place.

The electrofusion joint according to a third aspect is the electrofusion joint according to the first or second aspects, wherein the insulating cover film is formed from a polyimide resin.

Forming the insulating cover film from a polyimide resin makes it less likely that the insulating cover film will melt, even at the temperature at which fusion is performed with the heat generated by the heating wire.

The electrofusion joint according to a fourth aspect is the electrofusion joint according to the first to third aspects, wherein the main body has a tubular portion and a stopper. The tubular portion has a connecting portion configured to be disposed inside or outside the resin pipe and to be connected to the resin pipe. The stopper is formed so as to protrude from the surface of the tubular portion and is configured to restrict the position of the end of the resin pipe.

Even when fusion is performed in a state in which the resin pipe is pressed against the stopper so as not to form a gap in which foreign matter may settle, since an insulating cover film is formed around the heating wire, the conducting wire of the heating wire is prevented from coming into contact with adjacent parts, so good fusion strength can be ensured.

The electrofusion joint according to a fifth aspect is the electrofusion joint according to the fourth aspect, wherein the connecting portion is configured so that the resin pipe is inserted therein. The stopper is formed so as to protrude from the inner surface of the tubular portion, and restricts the insertion position when the resin pipe is inserted into the connecting portion.

Consequently, the resin pipe inserted into and the electrofusion joint can be securely fused.

The electrofusion joint according to a sixth aspect is the electrofusion joint according to the third aspect, wherein the connecting portion is configured to be inserted into the resin pipe. The stopper is formed so as to protrude from the outer surface of the tubular portion, and restricts the insertion position when the connecting portion is inserted into the resin pipe.

Consequently, the resin pipe and the electrofusion joint inserted therein can be securely fused.

The electrofusion joint according to a seventh aspect comprises a main body and a heating wire. The main body is configured to be connected to a resin pipe containing a thermoplastic resin. The heating wire is disposed in the main body. The heating wire has a conducting wire and an insulating cover film that is provided around the conducting wire. The insulating cover film has a melting point that is higher than the melting point of the resin used in the main body, allowing the insulating cover film to be preserved even after electrofusion.

The electrofusion joint with which a short circuit is less likely to occur, and good fusion strength can be ensured.

Figure 9:
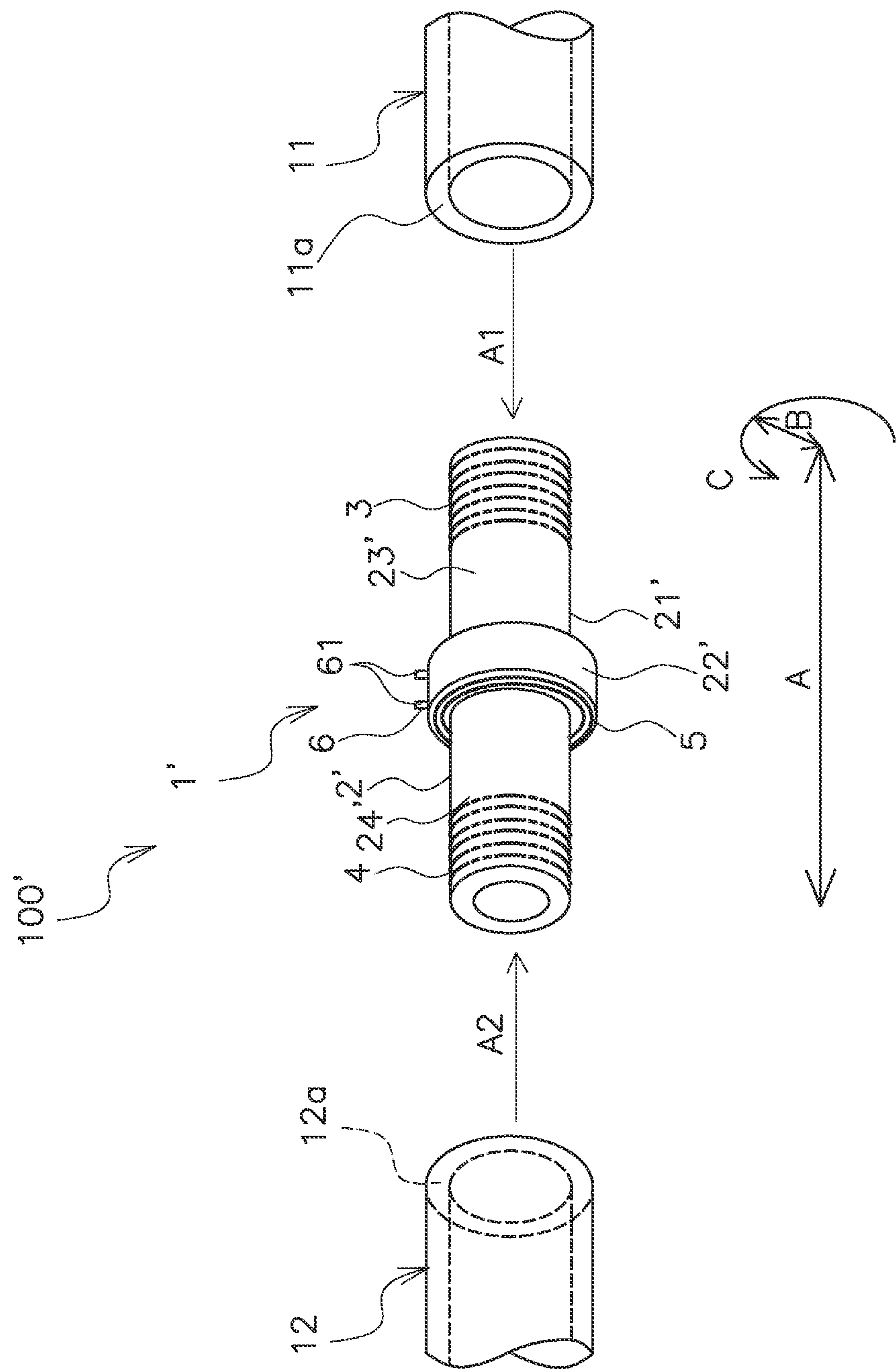
Figure 10:
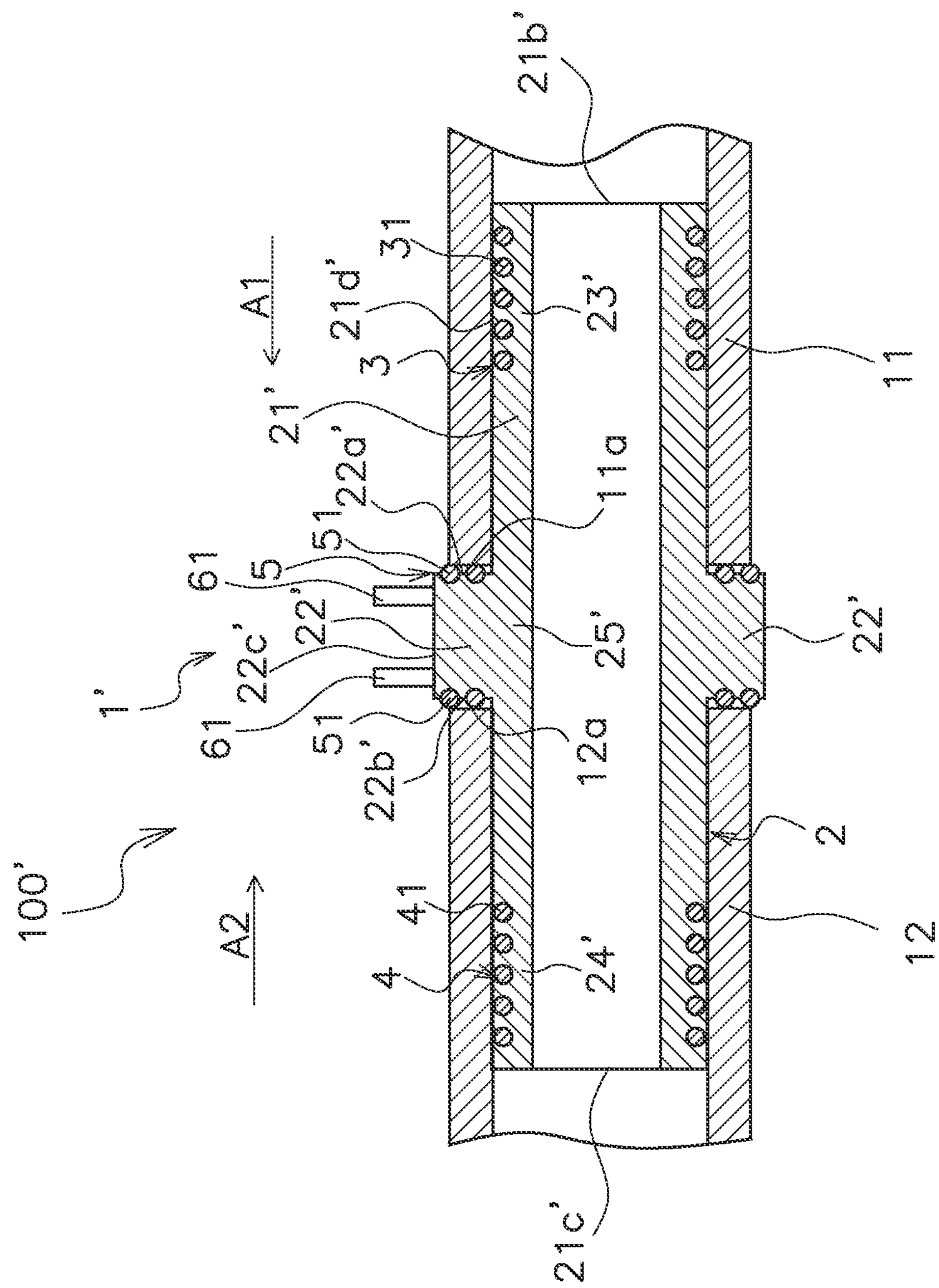

FIGS. *8a* and *8b* are schematic views of the melting process in the vicinity of a stopper;

FIG. 9 is an external view of the electrofusion joint and the first resin pipe and second resin pipe connected to the electrofusion joint in a modification example of the embodiment according to the present invention; and FIG. 10 is a cross-sectional configuration diagram showing a state in which the first resin pipe and the second resin pipe have been inserted into the electrofusion joint of FIG. 9.

DETAILED DESCRIPTION OF THE INVENTION

An embodiment of the invention will now be described with reference to the drawings.

Structure:

Overview of Electrofusion Joint 1

Figure 1:
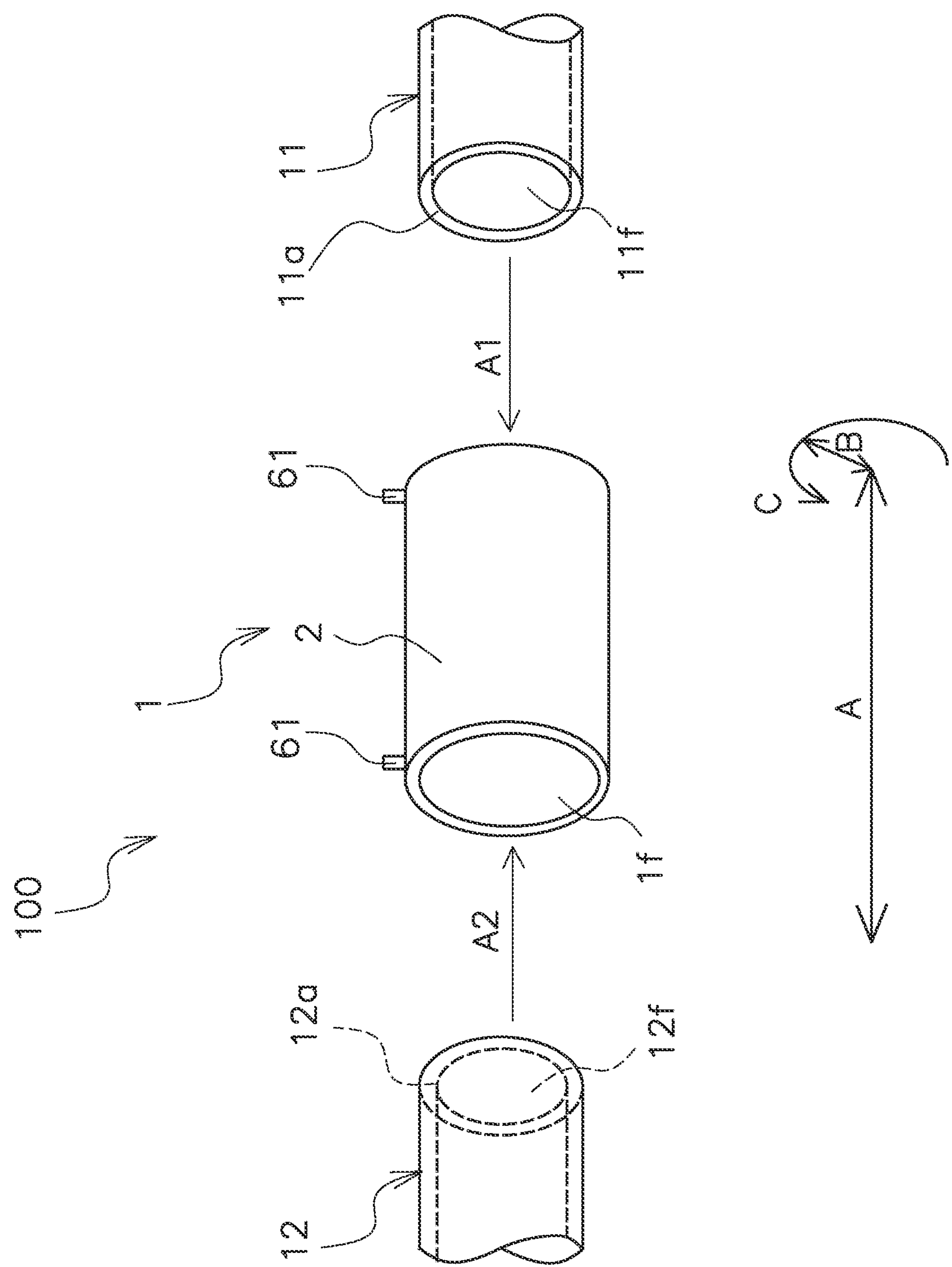
FIG. 1 is an external view showing an electrofusion joint, and a first resin pipe and a second resin pipe that are connected to the electrofusion joint, in an embodiment of the present invention.

FIG. 1 is a diagram showing an electrofusion joint 1 according to an embodiment of the present invention, and a first resin pipe 11 and a second resin pipe 12 that are connected by the electrofusion joint 1. FIG. 1 could also be called an exploded view of a piping structure 100. The piping structure 100 has, for example, the electrofusion joint 1, the first resin pipe 11, and the second resin pipe 12.

As shown in the drawing, the electrofusion joint 1 is fused to the first resin pipe 11 and the second resin pipe 12, thereby connecting the first resin pipe 11 and the second resin pipe 12.

The first resin pipe 11 and the second resin pipe 12 are each formed from a thermosetting resin.

Flow paths *11f* and *12f* having a circular cross section extend through the inside of the first resin pipe 11 and the second resin pipe 12. A flow path if having a circular cross section extends through the inside of the electrofusion joint 1. In a state in which the first resin pipe 11 and the second resin pipe 12 are connected by the electrofusion joint 1, the axes of the respective flow paths of the first resin pipe 11, the second resin pipe 12, and the electrofusion joint 1 all fall along the same straight line.

The direction in which each axis extends in the flow paths of the electrofusion joint 1, the first resin pipe 11, and the second resin pipe 12 is defined as the axial direction A. Also, the direction, which is orthogonal to the axes, of moving toward and away from the axes in the electrofusion joint 1, the first resin pipe 11, and the second resin pipe 12 is defined as the radial direction B, and the direction around each axis is defined as the circumferential direction C.

The first resin pipe 11 is connected to the electrofusion joint 1 by being moved in the direction of the arrow A1 (one of the axial directions A) relative to the electrofusion joint 1. Also, the second resin pipe 12 is connected to the electrofusion joint 1 by being moved in the direction of the arrow A2 (one of the axial directions A) relative to the electrofusion joint 1. A state in which the first resin pipe 11 and the second resin pipe 12 have been connected by the electrofusion joint 1 constitutes the piping structure 100.

Figure 2:
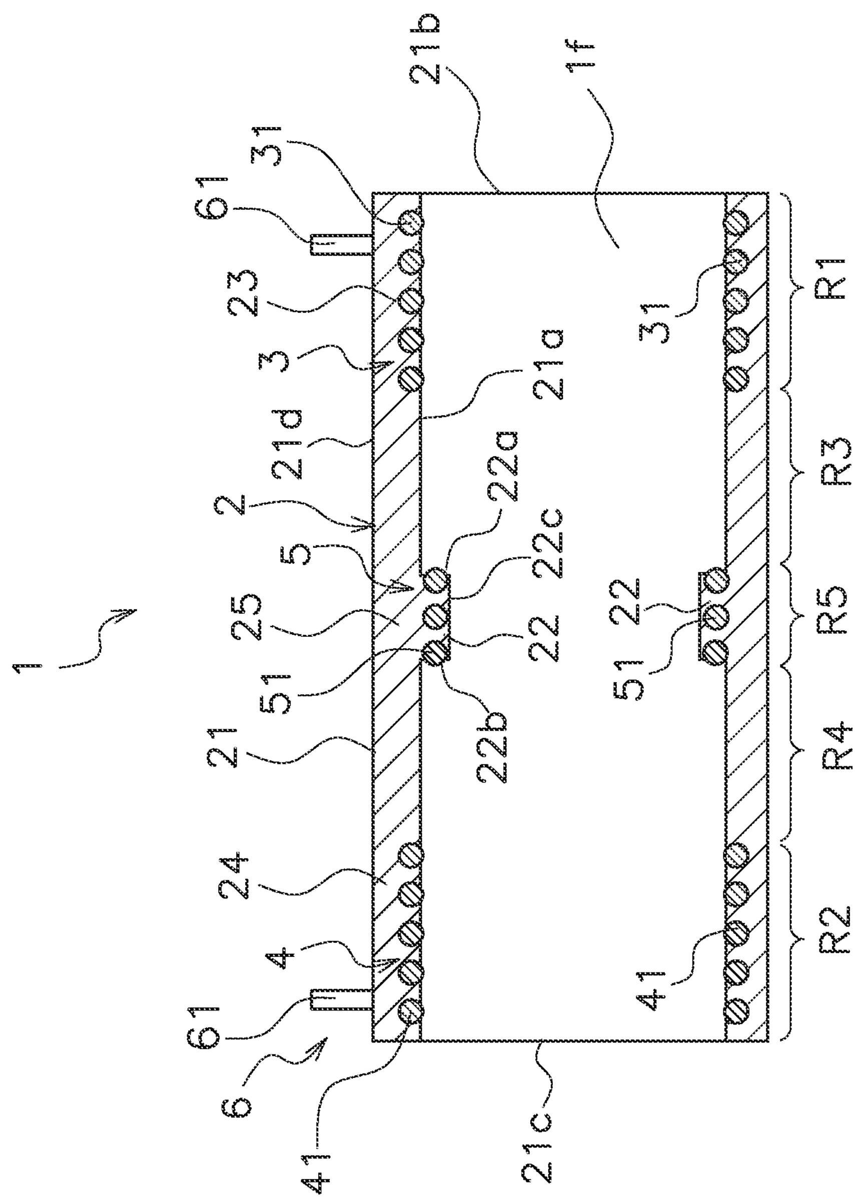
FIG. 2 is a cross-sectional configuration diagram showing the electrofusion joint of FIG. 1.

FIG. 2 is a diagram showing the cross-sectional configuration of the electrofusion joint 1.

As shown in FIGS. 1 and 2, the electrofusion joint 1 has a main body 2, a heat generating portion 3, a heat generating portion 4, a heat generating portion 5, and a connector attachment portion 6.

Main Body 2

The main body 2 is formed from a thermoplastic resin and has a tubular portion 21 and a stopper 22, as shown in FIG. 2. The tubular portion 21 is tubular and has a first connecting portion 23, a second connecting portion 24, and a continuous portion 25. The first resin pipe 11 is inserted into the first connecting portion 23. The second resin pipe 12 is inserted into the second connecting portion 24.

There are no particular restrictions on the thermoplastic resin used in the main body, but a resin having a melting point of less than 230° C. is preferable. A polyolefin is particularly preferable, and polyethylene is especially favorable.

Figure 3:
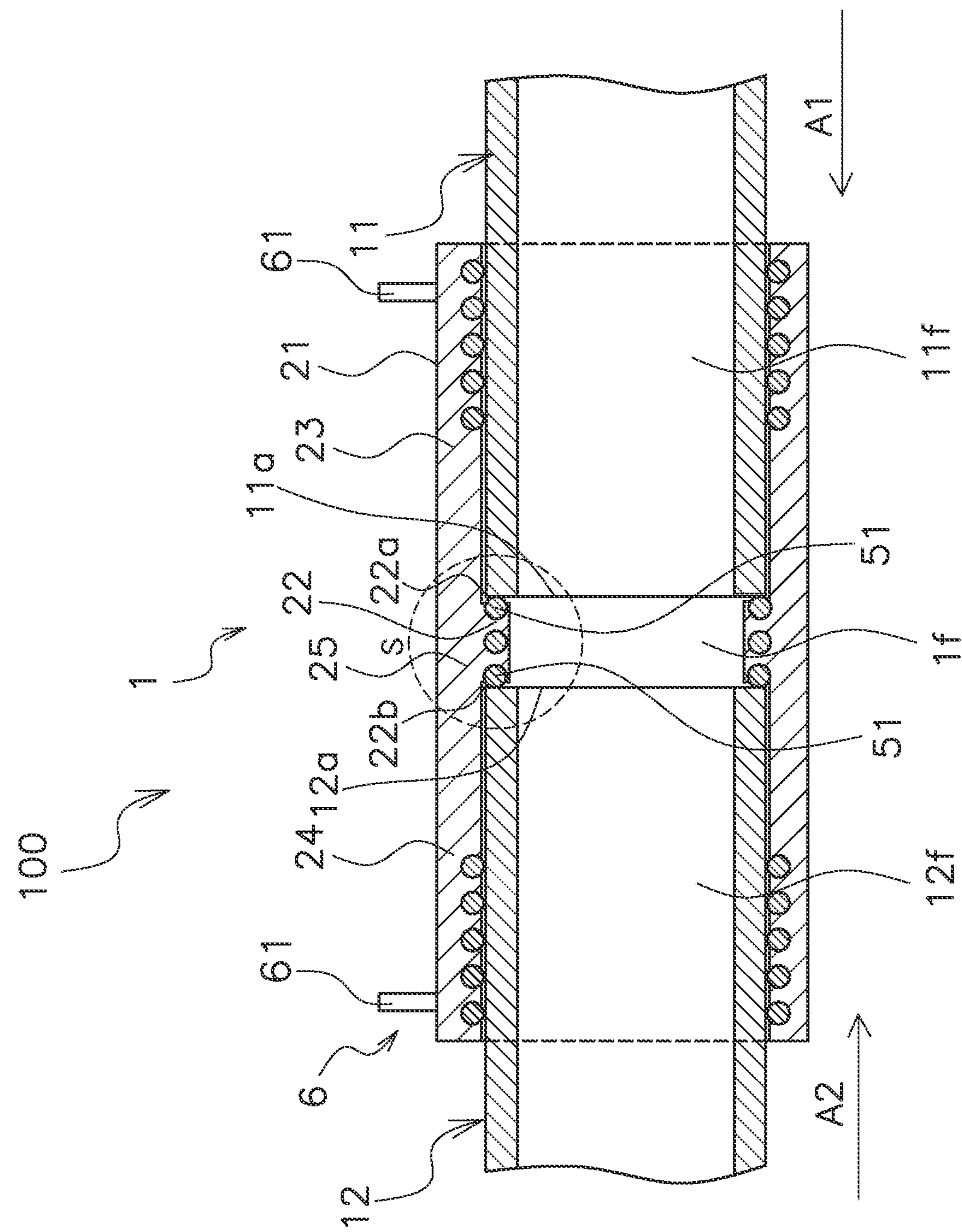
FIG. 3 is a cross-sectional configuration diagram showing a state in which a first resin pipe and a second resin pipe have been inserted into the electrofusion joint of FIG. 1.

FIG. 3 is a cross-sectional configuration diagram showing a state in which the first resin pipe 11 has been inserted into the first connecting portion 23 of the electrofusion joint 1 and the second resin pipe 12 has been inserted into the second connecting portion 24.

The inside diameter of the first connecting portion 23 equal to or larger than the outside diameter of the first resin pipe 11. The inside diameter of the second connecting portion 24 is equal to or larger than the outside diameter of the second resin pipe 12.

The continuous portion 25 is continuous with the first connecting portion 23 and the second connecting portion 24, and connects the first connecting portion 23 and the second connecting portion 24. The continuous portion 25 is a portion that spans the first connecting portion 23 and the second connecting portion 24, and a stopper 22 (discussed below) is provided inside the continuous portion 25 in the radial direction B.

Stopper 22

The stopper 22 is in the shape of a circular ring. The stopper 22 is formed on the inner surface *21a* of the tubular portion 21, as a rib going all the way around in the circumferential direction C. The stopper 22 also contains a thermoplastic resin, and is preferably formed from the same thermoplastic resin as that used in the main body.

The stopper 22 is formed so as to protrude inward in the radial direction from the inner surface *21a* of the tubular portion 21.

Also, the stopper 22 is disposed inside the continuous portion 25 of the tubular portion 21 in the radial direction B. The stopper 22 may be formed as a single member with the tubular portion 21, or may be formed as a separate member apart from the tubular portion 21.

The stopper 22 has a first side surface *22a*, a second side surface *22b*, and a peripheral surface *22c*. The peripheral surface *22c* is the end surface on the inner side of the stopper 22 in the radial direction.

The first side surface *22a* is formed substantially perpendicular to the axial direction A, inward in the radial direction B from the inner surface *21a* of the tubular portion 21.

The second side surface *22b* is formed substantially perpendicular to the axial direction A, inward in the radial direction B from the inner surface *21a* of the tubular portion 21.

The peripheral surface 22*c* links the end on the inside in the radial direction of the first side surface 22*a* to the end on the inside in the radial direction of the second side surface 22*b*. The peripheral surface 22*c* is formed substantially parallel to the inner surface 21*a* of the tubular portion 21.

When the first resin pipe 11 is inserted into the first connecting portion 23, as shown in FIG. 3, the pipe end 11*a* of the first resin pipe 11 comes into contact with the first side surface 22*a* of the stopper 22, which restricts the insertion position of the pipe end 11*a*. The concept of the pipe end 11*a* coming into contact with the first side surface 22*a* encompasses both when the pipe end 11*a* comes into direct contact with the first side surface 22*a*, and when the pipe end 11*a* comes into contact with the side surface 22*a* indirectly via the heating wire 51 (discussed below) of the heat generating portion 5.

When the second resin pipe 12 is inserted into the second connecting portion 24, as shown in FIG. 3, the pipe end 12*a* of the second resin pipe 12 comes into contact with the second side surface 22*b* of the stopper 22, and insertion position of the pipe end 12*a* is restricted. The concept that the pipe end 12*a* comes into contact with the second side surface 22*b* encompasses both when the pipe end 12*a* comes into direct contact with the second side surface 22*b*, and when the pipe end 12*a* comes into indirect contact with the side surface 22*b* via the heating wire 51 (discussed below) of the heat generating portion 5.

Heat Generating Portions 3 and 4

As shown in FIG. 2, the heat generating portion 3 has a heating wire 31 embedded in the inner surface 21*a* in a specific zone R1 along the axial direction A from the end 21*b* on the first connecting portion 23 side, which is one end of the tubular portion 21. The configuration of the heating wire 31 will be discussed below.

The heating wire 31 is disposed so as to be wound in the circumferential direction along the inner surface 21*a*. The heating wire 31 is disposed in the vicinity of the inner surface 21*a*. In this embodiment, the heating wire 31 is embedded in the tubular portion 21 so that a part thereof is exposed on the flow path if side.

The heat generating portion 4 has a heating wire 41 embedded in the inner surface 21*a* in a specific zone R2 along the axial direction A from the end 21*c* on the second connecting portion 24 side, which is the other end of the tubular portion 21. The configuration of the heating wire 41 will be discussed below.

The heating wire 41 is disposed so as to be wound in the circumferential direction along the inner surface 21*a*. The heating wire 41 is disposed in the vicinity of the inner surface 21*a*. In this embodiment, the heating wire 41 is embedded in the tubular portion 21 so that a part thereof is exposed on the flow path if side.

As shown in FIG. 2, the heating wires 31 and 41 may be embedded in the inner surface 21*a* so as to be partially exposed, or may be completely embedded in the inner surface 21*a* without being exposed, or may simply be disposed on the inner surface 21*a*, without being embedded. In other words, the heating wires 31 and 41 may be provided at any positions where the inner surfaces of the first connecting portion 23 and the second connecting portion 24 can be melted, and where the outer peripheral surfaces of the first resin pipe 11 and the second resin pipe 12 can be melted.

Also, the heating wire 31 is not continuously disposed in the zone R3 running along the axial direction A from the end on the continuous portion 25 side of the zone R1 of the first connecting portion 23 to the continuous portion 25 (stopper 22), and the zone R3 forms a cold zone. The heating wire 41 is not continuously disposed in the zone R4 along the axial direction A from the end on the continuous portion 25 side of the zone R2 of the second connecting portion 24 to the continuous portion 25 (stopper 22), and the zone R4 forms a cold zone. Also, a zone R5 running along the axial direction A between the zones R3 and R4 is the zone in which the stopper 22 is provided.

The heating wires 31 and 41 may be linked into a single wire with the heating wire 51 of the heat generating portion 5 (discussed below), or the heating wires 31 and 41 and the heating wire 51 may be divided.

Heat Generating Portion 5

The heat generating portion 5 is provided to the stopper 22. The heat generating portion 5 has the heating wire 51. The heating wire 51 is provided to the stopper 22 so as to be wound in the circumferential direction C along the axial direction A. In this embodiment, the heating wire 51 is wound around the stopper 22 three times, for example.

In this embodiment, the heating wire 51 is embedded in the first side surface 22*a* and the second side surface 22*b* so as to be partially exposed, but the heating wire 51 may be completely embedded, or may be disposed on the first side surface 22*a* and the first side surface 22*a*. Also, the heating wire 51 here is not exposed from the peripheral surface 22*c*, but it may be exposed.

Figure 4:
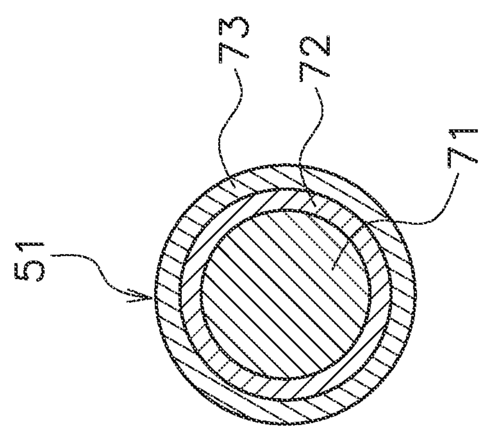
FIG. 4 is a cross-sectional configuration diagram of a heating wire in the electrofusion joint of FIG. 1.

FIG. 4 is a cross-sectional view of the configuration of the heating wire 51.

The heating wire 51 has a conducting wire 71, an insulating cover film 72, and an outer layer portion 73.

A nichrome wire, Fe chrome type 2 wire, Fe chrome type 1 wire, nickel chromium wire, or the like can be used for the conducting wire 71, for example.

The insulating cover film 72 is provided so as to cover the periphery of the conducting wire 71. The insulating cover film 72 has a melting point of at least 230 degrees. This temperature is set high enough that the insulating cover film 72 will not melt even at a temperature at which a thermoplastic resin melts in this embodiment (for example, in the case of polyethylene, the heating wire is heated to 220 degrees). The insulating cover film 72 can be formed from a fluorine-based resin or an imide-based resin, for example, but is preferably formed from a polyimide-based resin.

The outer layer portion 73 is provided so as to cover the outer periphery of the insulating cover film 72. The outer layer portion 73 is formed from a different thermoplastic resin from that of the insulating cover film 72. The outer layer portion 73 is preferably formed from a polyolefin-based resin.

The conducting wire 71 may be set to a thickness of at least 0.1 mm and no more than 10 mm. Also, the insulating cover film 72 may be set to a thickness of no more than 2 μm. Also, the outer layer portion 73 may be set to a thickness that is no more than 3 times the diameter of the conducting wire 71.

In this embodiment, the heating wires 31 and 41 have the same configuration as the heating wire 51, but may have a different configuration from that of the heating wire 51.

Connector Attachment Portion 6

The connector attachment portion 6 has two pins 61, as shown in FIG. 2. The two pins 61 are provided so as to protrude outward in the radial direction from the outer surface 21*d* of the tubular portion 21. As shown in FIG. 2, one of the pins 61 is disposed in the vicinity of the end 21*b*, and the other pin 61 is disposed in the vicinity of the end 21*c*. Although not depicted in the drawings, the two pins 61 are connected to the heating wires 31, 41, and 51 of the heat generating portions 3, 4, and 5. When the connector of the electrofusion device is attached to the pin 61 and power is switched on, the heating wires 31, 41, and 51 generate heat.

Fusion Method

Figure 5:
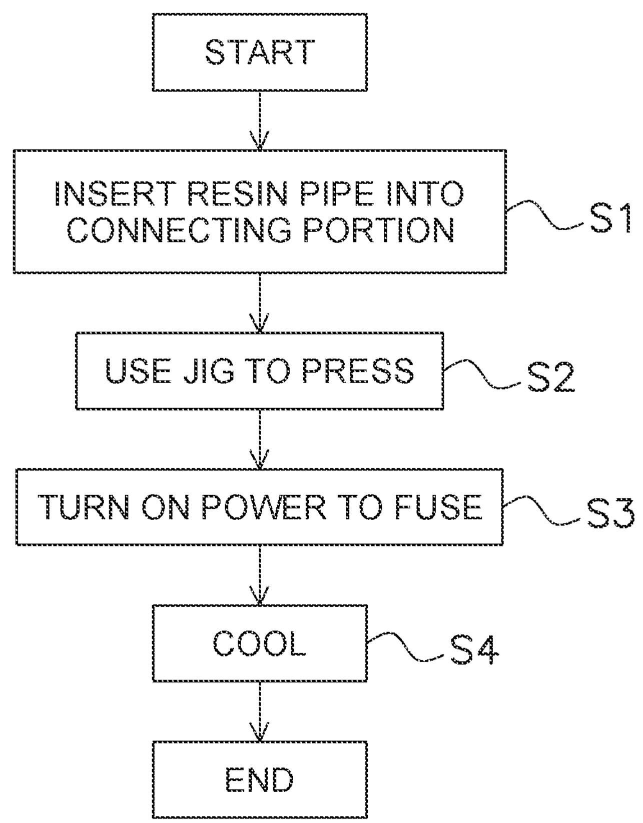
FIG. 5 is a flowchart illustrating a fusion method in which the electrofusion joint of FIG. 1 is used.

Next, the fusion method will be described. FIG. 5 is a flowchart illustrating the fusion method in this embodiment.

First, in step S1, the first resin pipe 11 is inserted into the first connecting portion 23 of the electrofusion joint 1 until the stopper 22 restricts the relative movement of the pipe end 11*a* of the first resin pipe 11.

Also, the second resin pipe 12 is inserted into the second connecting portion 24 of the electrofusion joint 1 until the stopper 22 restricts the relative movement of the pipe end 12*a* of the second resin pipe 12. FIG. 3 shows a state in which the first resin pipe 11 and the second resin pipe 12 have been inserted into the electrofusion joint 1.

Next, in step S2, the first resin pipe 11 is pressed in the direction of the stopper 22 (the direction of arrow A1 shown in FIG. 3) so as to press the pipe end 11*a* against the first side surface 22*a* of the stopper 22. Also, the second resin pipe 12 is pressed in the direction of the stopper 22 (the direction of arrow A2 shown in FIG. 3) so as to press the pipe end 12*a* against the second side surface 22*b* of the stopper 22.

Figure 6:
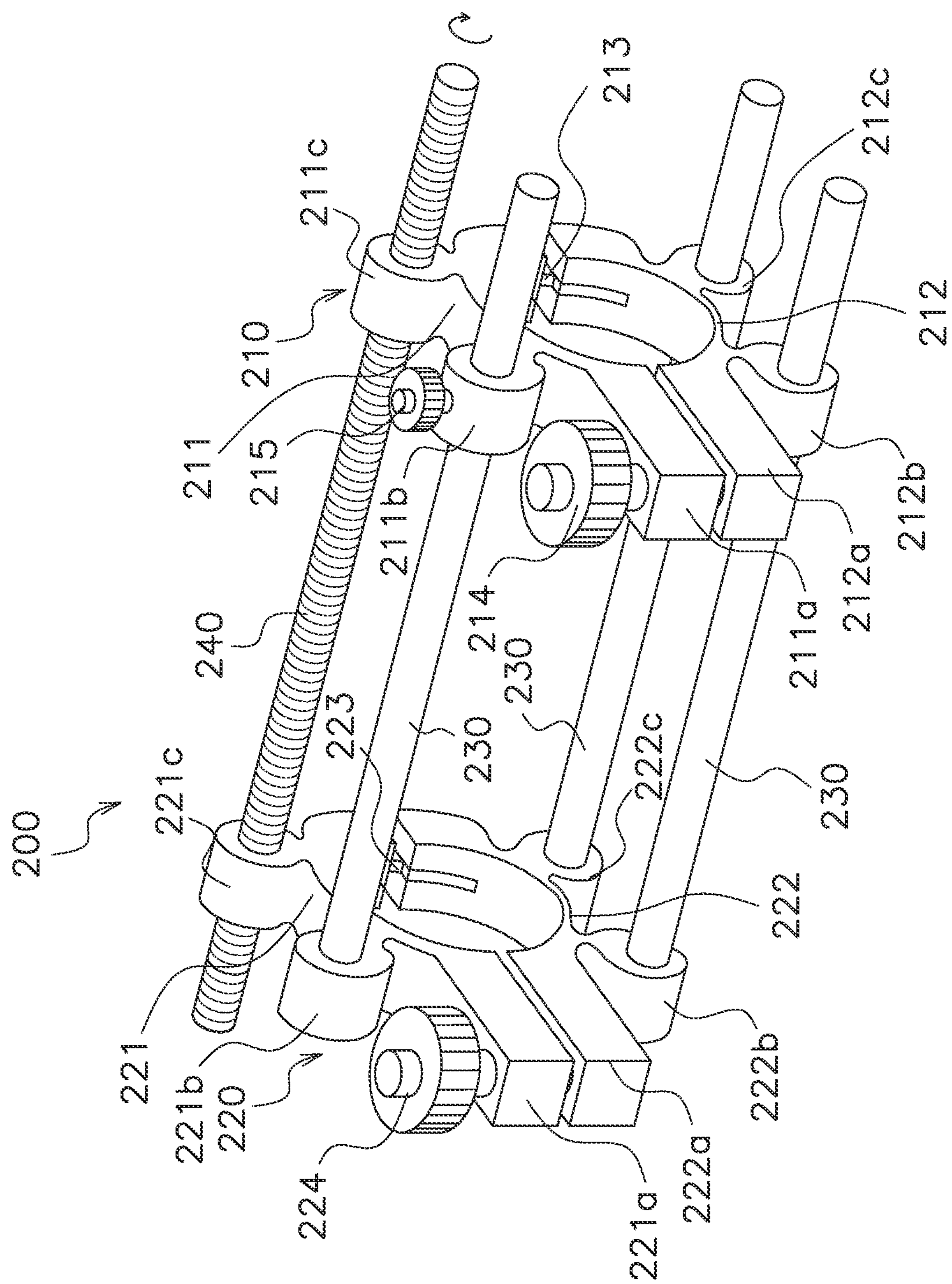
FIG. 6 is an oblique view of a pressing jig used in the fusion method of FIG. 5.
Figure 7:
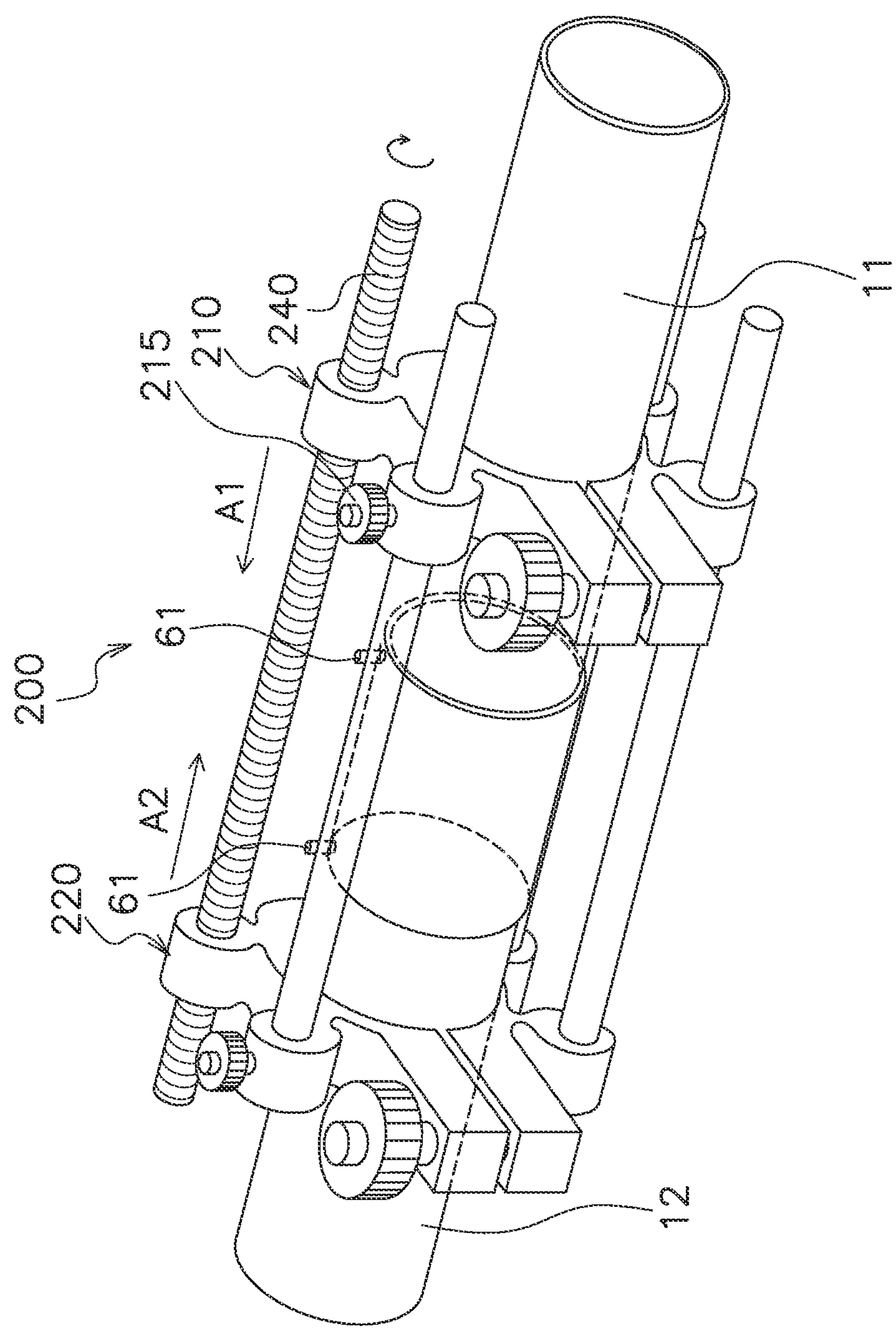
FIG. 7 is a diagram showing a state in which a first resin pipe, an electrofusion joint, and a second resin pipe have been attached to the pressing jig of FIG. 6.

The pressing jig used for the pressing will now be described. FIG. 6 is a diagram showing a pressing jig 200. FIG. 7 is a diagram showing a state in which the first resin pipe 11, the electrofusion joint 1, and the second resin pipe 12 have been attached to the pressing jig 200.

The pressing jig 200 has a first clamp portion 210, a second clamp portion 220, three guide members 230, and a threaded pressing member 240.

The first clamp portion 210 has a first semi-annular portion 211, a second semi-annular portion 212, a hinge portion 213, a tightening portion 214, and a position fixing portion 215.

The first semi-annular portion 211 and the second semi-annular portion 212 are in the approximate shape of a half ring, and can sandwich the outer periphery of the first resin pipe 11. The first semi-annular portion 211 has on its outer periphery a guide support portion 211*b* and a threaded portion 211*c*. A through-hole is formed in the guide support portion 211*b*, and a rod-shaped guide member 230 is inserted therein.

The second semi-annular portion 212 has on its outer periphery two guide support portions 212*b* and 212*c*. A through-hole is formed in each of the guide support portion 212*b* and the guide support portion 212*c*, and the rod-shaped guide members 230 are inserted therein.

The hinge portion 213 rotatably links the peripheral ends of the first semi-annular portion 211 and the second semi-annular portion 212. The first resin pipe 11 is disposed between the first semi-annular portion 211 and the second semi-annular portion 212 in a state in which the space between the first semi-annular portion 211 and the second semi-annular portion 212 is open, with the hinge portion 213 in the center.

The tightening portion 214 is a screw, for example, and is provided at the end on the opposite side in the peripheral direction from the hinge portion 213 of the first semi-annular portion 211 and the second semi-annular portion 212. The end of the first semi-annular portion 211 on the opposite side in the peripheral direction from the hinge portion 213 protrudes outward, and a through-hole is formed in the protruding portion 211*a*. Also, the end of the second semi-annular portion 212 on the opposite side in the peripheral direction from the hinge portion 213 protrudes outward, and a through-hole is formed in the protruding portion 212*a*.

In a state in which the first semi-annular portion 211 and the second semi-annular portion 212 are closed, the two through-holes are opposite each other, and the tightening portion 214 (a screw) is inserted. The inner peripheral surface of the through-hole in the protruding portion 212*a* is threaded, and the through-hole in the protruding portion 211*a* is not threaded. The tightening portion 214 is inserted into the through-hole of the protruding portion 211*a* and screwed into the through-hole of the protruding portion 212*a*.

Consequently, when the tightening portion 214 is rotated, the protruding portion 211*a* is pressed against the protruding portion 212*a* by the head of the tightening portion 214, and the first resin pipe 11 can be clamped by the first clamp portion 210. The tightening portion 214 is not limited to being a screw, and may instead be a bolt and nut, for example, and there are no limitations on the configuration so long as the first semi-annular portion 211 and the second semi-annular portion 212 can be tightened.

The position fixing portion 215 is a threaded member and is provided to the guide support portion 211*b*. More precisely, a threaded hole is formed in the guide support portion 211*b* toward the through-hole into which the guide member 230 is inserted, and the position fixing portion 215 is inserted into this threaded hole.

When the position fixing portion 215 is tightened, the distal end of the position fixing portion 215 comes into contact with the guide member 230, and this fixes the position of the first clamp portion 210 with respect to the guide member 230.

The second clamp portion 220 has a first semi-annular portion 221, a second semi-annular portion 222, a hinge portion 223, and a tightening portion 224.

The first semi-annular portion 221 has the same shape as the first semi-annular portion 211, and has a protruding portion 221*a*, a guide support portion 221*b*, and a threaded portion 221*c*. Unlike the guide support portion 211*b*, the guide member 230 is fixed to the guide support portion 221*b*.

Also, the second semi-annular portion 222 has the same shape as the second semi-annular portion 212, and has a protruding portion 222*a*, a guide support portion 222*b*, and a guide support portion 222*c*. Unlike the guide support portions 212*b* and 212*c* differ from the guide support portions 222*b* and 222*c* in that the guide members 230 are fixed thereto.

The hinge portion 223 is the same as the hinge portion 213, and rotatably links the ends in the peripheral direction of the first semi-annular portion 221 and the second semi-annular portion 222. The tightening portion 224 is the same as the tightening portion 214, and is provided to the protruding portion 221*a* and the protruding portion 222*a*.

The guide member 230 is inserted through the guide support portion 211*b* and fixed to the guide support portion 221*b*. The guide member 230 is inserted through the guide support portion 212*b* and fixed to the guide support portion 222*b*. The guide member 230 is inserted through the guide support portion 212*c* and fixed to the guide support portion 222*c*.

The threaded pressing member 240 is a ball screw, and is inserted into the threaded portion 211*c* and the threaded portion 221*c*. The threaded portion 211*c* and the threaded portion 221*c* are formed with threaded holes through which the threaded pressing member 240 is inserted, and the threaded portion 211*c* and the threaded portion 221*c* are formed with threaded holes in the opposite direction. That is, when the threaded pressing member 240 is rotated, the first clamp portion 210 and the second clamp portion 220 move toward or away from each other along the guide member 230.

As shown in FIG. 7, the first resin pipe 11 is squeezed and fixed by the first clamp portion 210, the second resin pipe 12 is squeezed and fixed by the second clamp portion 220, and when the threaded pressing member 240 is then rotated, the first clamp portion 210 and the second clamp portion 220 move toward each other (see arrows A1 and A2).

This allows the first resin pipe 11 and the second resin pipe 12 to be pressed so that the pipe end 11*a* of the first resin pipe 11 is pressed against the first side surface 22*a* of the stopper 22, and the pipe end 12*a* of the second resin pipe 12 is pressed against the second side surface 22*b* of the stopper 22.

Also, the pressed state produced by the first clamp portion 210 and the second clamp portion 220 can be maintained by tightening the position fixing portion 215 in the pressed state.

Next, in step S3, in a pressed state, the connector of the electrofusion device is attached to the two pins 61 of the connector attachment portion 6, and the power is turned on for a specific length of time. The threaded pressing member 240 may be rotated while the power is on so that the first resin pipe 11 and the second resin pipe 12 are pushed into the electrofusion joint 1.

The flow of current causes the heating wires 31, 41, and 51 to generate heat. The heating wire temperature when the power is on may be any temperature that is high enough to melt the main body, and in the case of a polyolefin, the temperature is preferably no higher than 220 degrees.

The heat generated by the heating wire 31 in the zone R1 melts and expands the thermoplastic resin on the inner peripheral surface of the first connecting portion 23 and the outer peripheral surface of the first resin pipe 11. In the zone R3 (cold zone), the thermoplastic resin is solidified and sealed, raising the resin pressure between the outer peripheral surface of the first resin pipe 11 and the first connecting portion 23. In this way, the inner peripheral surface of the first connecting portion 23 and the outer peripheral surface of the first resin pipe 11 are fused, and high fusion strength is exhibited.

Similarly, the heat generated by the heating wire 41 in the zone R2 melts and expands the thermoplastic resin on the inner peripheral surface of the second connecting portion 24 and the outer peripheral surface of the second resin pipe 12. In the zone R4 (cold zone), the thermoplastic resin is solidified and sealed, raising the resin pressure between the outer peripheral surface of the second resin pipe 12 and the second connecting portion 24, and fusing the inner peripheral surface of the second connecting portion 24 and the outer peripheral surface of the second resin pipe 12.

Figure 8:
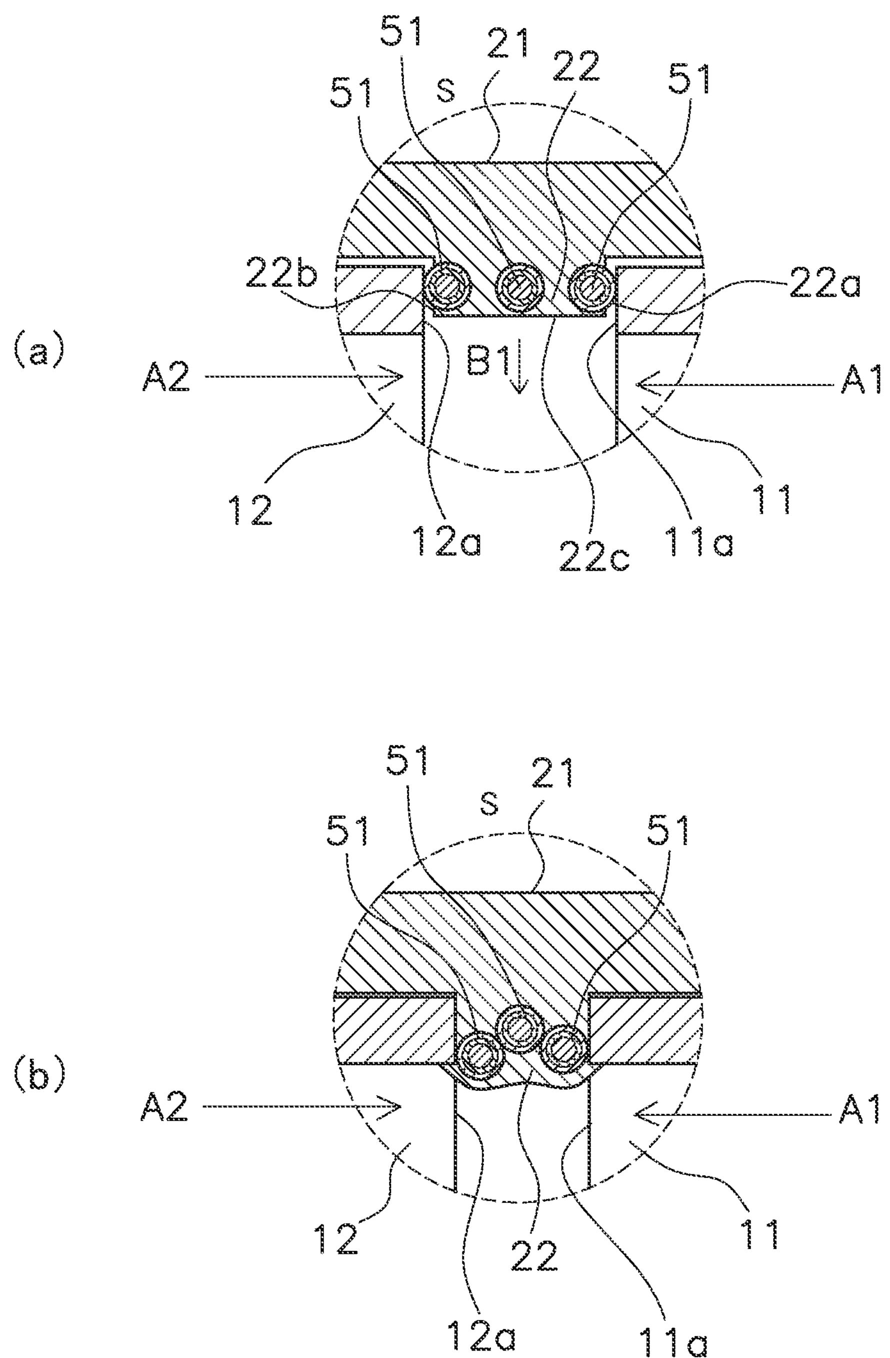

FIGS. 8*a* and 8*b* are detail views of the S portion in FIG. 3, and are schematic views of the melting process in the vicinity of the stopper 22. As shown in FIG. 8*a*, the thermoplastic resin melted by the stopper 22 in the zone R5 flows toward the center in the radial direction (see arrow B1), and the heating wire 51 also gradually moves as this happens. When the power is left on further, the thermoplastic resin is melted at the place to which it has moved, and the movement of the heating wire 51 proceeds. The movement of the heating wire can be controlled by adjusting how long the power is left on and the pushing pressure on the resin pipe during melting. In FIG. 8*b*, the thermoplastic resin melted in the stopper 22 protrudes inward more than the inner peripheral surfaces of the first resin pipe 11 and the second resin pipe 12, but may be recessed rather than protruding. The protrusion height of the stopper 22 in the radial direction B is preferably about the same as the diameter of the heating wire 51.

Also, in this embodiment, since the conducting wire 71 of the heating wire 51 has an insulating coating, the metal portion will not be exposed even when exposed to the flow path.

Also, as shown in FIG. 8*b*, the movement of the heating wire 51 allows fusion up to the vicinity of the inner surface (near the wetted surface) of the first resin pipe 11 and the second resin pipe 12, so the gap between the stopper 22 and the first resin pipe 11 and second resin pipe 12 can be eliminated, which means fewer places for foreign matter to settle.

Next, in step S4, the resin is cooled by allowing it to stand for a certain length of time after the power has been turned off.

The above procedure allows the electrofusion joint 1 to be fusion-bonded with the first resin pipe 11 and the second resin pipe 12.

Features (1)

The electrofusion joint 1 of this embodiment comprises the main body 2 and the heating wire 51. The main body 2 is configured to be connected to the first resin pipe 11 and the second resin pipe 12, which contain a thermoplastic resin. The heating wire 51 is disposed in the main body 2. The heating wire 51 has the conducting wire 71 and the insulating cover film 72, which is provided around the conducting wire 71. The insulating cover film 72 has a melting point of at least 230 degrees.

When the insulating cover film 72 having a melting point of at least 230 degrees is thus provided around the conducting wire 71, the insulating cover film 72 will not be melted even at the temperature at which fusion is performed with the heat generated by the heating wire 51, which prevents the conducting wire 71 of the heating wire 51 from coming into contact with each other. Therefore, the temperature can be raised to the desired level, and good fusion strength can be ensured.

(2)

With the electrofusion joint 1 in this embodiment, the heating wire 51 further has the outer layer portion 73, which is provided around the insulating cover film 72. The outer layer portion 73 is formed from a polyolefin-based resin.

This allows the strength of the heating wire 51 to be increased, and prevents the conducting wire 71 from being exposed at the temperature at which fusion is performed.

(3)

With the electrofusion joint 1 of this embodiment, the insulating cover film 72 is formed from a polyimide-based resin.

Thus forming the insulating cover film 72 from a polyimide-based resin suppresses melting of the insulating cover film 72 even at the temperature at which fusion is performed with the heat generated by the heating wire 51.

(4)

With the electrofusion joint 1 of this embodiment, the main body 2 has the tubular portion 21 and the stopper 22. The tubular portion 21 has a first connecting portion 23 (an example of a connecting portion) configured to be disposed outside the first resin pipe 11 and to be connected to the first resin pipe 11. The tubular portion 21 has a second connecting portion 24 (an example of a connecting portion) configured to be disposed outside the second resin pipe 12 and to be connected to the second resin pipe 12. The stopper 22 is formed so as to protrude from the surface of the tubular portion 21, and allows the position of the pipe end 11*a* (an example of an end) of the first resin pipe 11 and the pipe end 12*a* (an example of an end) of the second resin pipe 12 to be restricted.

Because the insulating cover film 72 is formed around the conducting wire 71, contact between adjacent parts of the heating wire 51 can be prevented even when fusion is performed in a state in which the first resin pipe 11 and the second resin pipe 12 have been pressed against the stopper 22 so as not to form a gap in which foreign matter will settle, and this ensures good fusion strength.

(5)

With the electrofusion joint 1 of this embodiment, the first connecting portion 23 is configured so that the first resin pipe 11 is inserted therein. The second connecting portion 24 is configured so that the second resin pipe 12 is inserted therein. The stopper 22 is formed so as to protrude from the inner surface 21*a* of the tubular portion 21, can restrict the insertion position when the first resin pipe 11 is inserted into the first connecting portion 23, and can restrict the insertion position when the second resin pipe 12 is inserted into the second connecting portion 24.

Consequently, the first resin pipe 11 and the second resin pipe 12 inserted inside can be securely fused with the electrofusion joint 1.

OTHER EMBODIMENTS

An embodiment of the present invention was described above, but the present invention is not limited to or by the above embodiment, and various modifications are possible without departing from the gist of the invention.

(A)

In the above embodiment, the pipe end 11*a* of the first resin pipe 11 and the pipe end 12*a* of the second resin pipe 12 are pressed against the stopper 22, but they need not be pressed. However, it is preferable to press these ends because construction will take less time.

(B)

In the above embodiment, the stopper 22 is formed so as to protrude inward in the radial direction from the inner surface 21*a* of the tubular portion 21, but this is not the only option. For instance, as shown in FIG. 9, in an electrofusion joint 1', a stopper 22' may be formed so as to protrude outward in the radial direction from the outer surface of a tubular portion 21'.

FIG. 9 is an exploded view of a piping structure 100', which is a modification example of this embodiment. The piping structure 100' has the electrofusion joint 1', and the first resin pipe 11 and the second resin pipe 12 that are connected to the electrofusion joint 1'. In FIG. 9, the electrofusion joint 1' is inserted into the first resin pipe 11 and the second resin pipe 12. FIG. 10 is a cross-sectional view showing a state in which the electrofusion joint 1' has been inserted into the first resin pipe 11 and the second resin pipe 12.

The main body 2' has a tubular portion 21' and a stopper 22'. The tubular portion 21' has a first connecting portion 23', a second connecting portion 24', and a continuous portion 25'. The first connecting portion 23' of the electrofusion joint 1' is inserted into the first resin pipe 11, and the second connecting portion 24' of the electrofusion joint 1' is inserted into the second resin pipe 12. The stopper 22' is provided on the outside of the continuous portion 25'. The stopper 22' is formed so as to protrude outward in the radial direction from the outer surface 21*d'* of the tubular portion 21'. The stopper 22' is also formed as a rib that goes all the way around in the circumferential direction C.

The stopper 22' has a first side surface 22*a'*, a second side surface 22*b'*, and an outer peripheral surface 22*c'*. The outer peripheral surface 22*c'* is the end surface of the stopper 22' that is on the outside in the radial direction.

The first side surface 22*a'* is formed substantially perpendicular to the axial direction A, facing outward in the radial direction B from the outer surface 21*d'* of the tubular portion 21'. The second side surface 22*b'* is formed substantially perpendicular to the axial direction A, facing outward in the radial direction B from the outer surface 21*d'* of the tubular portion 21'. The outer peripheral surface 22*c'* links the end on the outside in the radial direction of the first side surface 22*a'* with the end on the outside in the radial direction of the second side surface 22*b'*.

The heat generating portion 3 is disposed closer to the outer surface 21*d'* in a specific zone (corresponding to the zone R1 in FIG. 2) from the end 21*b'* on the first connecting portion 23' side of the tubular portion 21', and is provided up to a position where is separated from the stopper 22' by a specific zone (corresponding to the zone R3 in FIG. 2). The heat generating portion 4 is disposed closer to the outer surface 21*d'* in a specific zone (corresponding to the zone R2 in FIG. 2) from the end 21*c'* on the second connecting portion 24' side of the tubular portion 21', and is provided up to a position where is separated from the stopper 22' by a specific zone (corresponding to the zone R4 in FIG. 2). The heating wire 31 of the heat generating portion 3 and the heating wire 41 of the heat generating portion 4 are embedded in the outer surface 21*d'* of the tubular portion 21. In FIG. 10, a part of the heating wire 31 and a part of the heating wire 41 are exposed to the outside from the outer surface 21*d'*.

The heat generating portion 5 is provided to the stopper 22'. The heating wire 51 of the heat generating portion 5 is embedded in the first side surface 22*a'* and the second side surface 22*b'* of the stopper 22'. A part of the heating wire 51 is exposed from the first side surface 22*a'* or the second side surface 22*b'*. The two pins 61 of the connector attachment portion 6 are disposed on the outer peripheral surface 22*c'* of the stopper 22'.

Using the pressing jig 200 described above, the pipe end 11*a* of the first resin pipe 11 is pressed against the first side surface 22*a'*, and the pipe end 12*a* of the second resin pipe 12 is pressed against the second side surface 22*b'*, and in this state the power is turned on to the heating wires 31, 41, and 51, which fuses and joins the first resin pipe 11 and the second resin pipe 12 to the electrofusion joint 1'.

Again with this configuration, the melting of the thermoplastic resin moves the position of the heating wire 51 of the heat generating portion 5, but since the insulating cover film 72 is provided, the conducting wires 71 can be prevented from coming into contact with each other and causing a short circuit.

(C)

In the above embodiment, when viewed along the axial direction A, the stopper 22 is circular, but need not be circular, and a part of the stopper 22 may be chamfered, or the stopper 22 may have a polygonal shape.

(D)

In the above embodiment, the flow paths of the electrofusion joints 1 and 1' are both formed in a linear shape, but an elbow joint in which the flow paths are curved may be used instead.

(E)

In the above embodiment, the heating wires 31, 41, and 51 of the heat generating portions 3, 4, and 5 are all the same, so the insulating cover film 72 is provided to all the heating wires 31, 41, and 51, but this is not the only option. However, it is preferable for the insulating cover film 72 to be provided at least to the heating wire 51. This is because adjacent parts of the heating wire 51 are prone to coming into contact with each other, as they may be pressed by the first resin pipe 11 and the second resin pipe 12.

INDUSTRIAL APPLICABILITY

The electrofusion joint of the present invention has the effect of suppressing the short circuiting and ensuring good fusion strength, and is useful as a piping structure for factories and the like.

REFERENCE SIGNS LIST

1: electrofusion joint
2: main body
5: heat generating portion
51: heating wire
71: conducting wire
72: insulating cover film
73: outer layer portion

The invention claimed is:

1. An electrofusion joint, comprising:
a main body configured to be connected to a resin pipe containing a thermoplastic resin; and
a heating wire,
wherein:
the heating wire includes a conducting wire, an insulating cover film in an annular shape around the conducting wire, and an outer layer portion in an annular shape around the insulating cover film;
the insulating cover film has a melting point of at least 230° C.; and
the outer layer portion is made of a polyolefin-based resin;
the main body includes:
a tubular portion having a connecting portion configured to: (i) be disposed inside or outside the resin pipe; (ii) be connected to the resin pipe; and (iii) receive the resin pipe; and
a stopper protruding from an inner surface of the tubular portion, the stopper being configured to restrict an insertion position of an end of the resin pipe when the resin pipe is inserted into the connecting portion;
the stopper is configured to protrude radially inward less than an inner peripheral surface of the resin pipe when the resin pipe is inserted into the connecting portion;
the heating wire is in the stopper;
the heating wire is wound three or more times along an axial direction of the tubular portion in the stopper; and
the heating wire is wound around the stopper in a single spiral shape.

2. The electrofusion joint according to claim 1,
wherein the insulating cover film is made of a polyimide-based resin.

3. A fusion method of connecting the electrofusion joint according to claim 1 and the resin pipe, the fusion method comprising:
inserting the resin pipe into the connecting portion of the electrofusion joint; and
turning on a power to the heating wire while pressing the end of the resin pipe against the stopper.

4. An electrofusion joint, comprising:
a main body configured to be connected to a resin pipe containing a thermoplastic resin; and
a heating wire,
wherein:
the heating wire includes a conducting wire, an insulating cover film in an annular shape around the conducting wire, and an outer layer portion in an annular shape around the insulating cover film;
a melting point of the insulating cover film is higher than a melting point of the main body;
the outer layer portion is made of a polyolefin-based resin;
the main body includes:
a tubular portion having a connecting portion configured to: (i) be disposed inside or outside the resin pipe; (ii) be connected to the resin pipe; and (iii) receive the resin pipe; and
a stopper protruding from an inner surface of the tubular portion, the stopper being configured to restrict an insertion position of an end of the resin pipe when the resin pipe is inserted into the connecting portion;
the stopper is configured to protrude radially inward less than an inner peripheral surface of the resin pipe when the resin pipe is inserted into the connecting portion;
the heating wire is in the stopper;
the heating wire is wound three or more times along an axial direction of the tubular portion in the stopper; and
the heating wire is wound around the stopper in a single spiral shape.

5. The electrofusion joint according to claim 4,
wherein the insulating cover film is made of a polyimide-based resin.

6. A fusion method of connecting the electrofusion joint according to claim 4 and the resin pipe, the fusion method comprising:
inserting the resin pipe into the connecting portion of the electrofusion joint; and
turning on a power to the heating wire while pressing the end of the resin pipe against the stopper.

* * * * *